March 27, 1951    P. W. STEIN    2,546,280
FISHING ROD HOLDER
Filed June 9, 1947
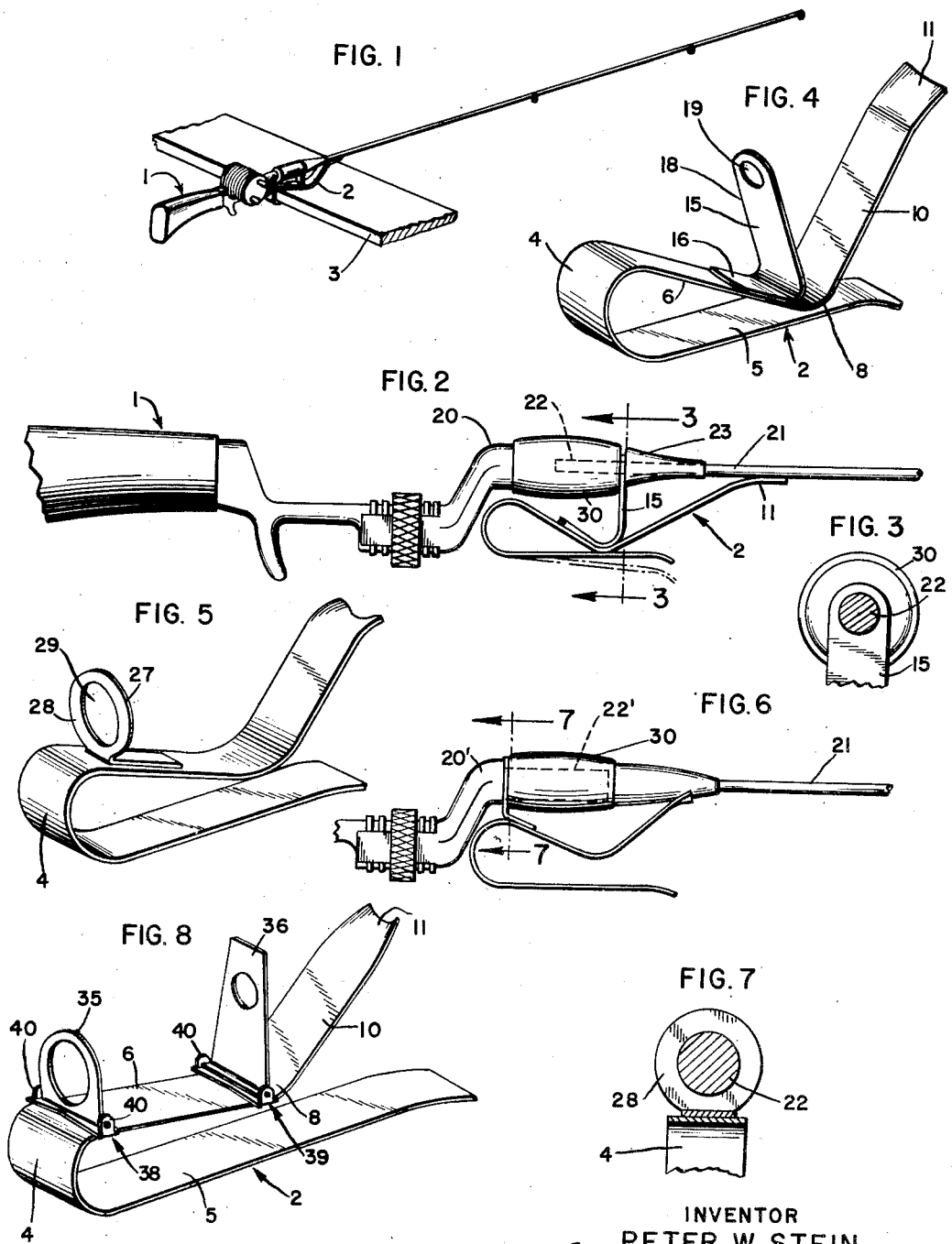
INVENTOR
PETER W. STEIN
BY Morris Spector
ATTORNEY Patented Mar. 27, 1951

2,546,280

UNITED STATES PATENT OFFICE 2,546,280

FISHING ROD HOLDER

Peter W. Stein, Chicago, Ill., assignor of one-half to Anthony F. Formato, Chicago, Ill.

Application June 9, 1947, Serial No. 753,401

1 Claim. (Cl. 248—42)

This invention relates to fishing rod holders and more particularly to a holder for enabling the fishing rod to be clamped to a part of a boat and be held by the holder in proper position.

It is one of the objects of the present invention to provide a fishing rod support of the above mentioned character which will be simple and economical of construction and which can be quickly and easily secured to or removed from a part of a boat and which can be quickly and easily secured to or removed from a fishing rod.

It is a further object of the present invention to provide a fishing rod holder which can be secured to a fishing rod for mounting of the fishing rod on a boat and yet wherein the holder attached to the fishing rod will not interfere with the normal use of the fishing rod either for casting or for other fishing operations.

It is a still further object of the present invention to provide a fishing rod holder for supporting a rod from a boat and wherein a rod with the holder attached thereto may be quickly and easily removed from the boat and the holder will not interfere with the operation or manipulation of a fishing reel that may be connected to the rod.

The attainment of the above and further objects of the present invention will be apparent from the following specification taken in conjunction with the accompanying drawing forming a part thereof.

Figure 1 is a perspective view of a fishing rod holder embodying the present invention and mounted in position for use;

Figure 2 is an enlarged side view of the structure of Figure 1;

Figure 3 is a sectional view taken along the line 3—3 of Figure 2;

Figure 4 is a perspective view of the holder of Figure 1;

Figure 5 is a perspective view of a modified construction for holding a different type of fishing rod;

Figure 6 is an end view of the holder of Figure 5 shown as supporting a fishing rod;

Figure 7 is a sectional view taken along the line 7—7 of Figure 6; and

Figure 8 is a perspective view corresponding to Figures 4 and 5 and illustrating a modified construction.

Reference may now be had more particularly to the drawing wherein like reference numerals designate like parts throughout.

In the drawing there is shown at 1 one conventional type of fishing rod to which the rod holder 2 of the present invention has been applied, the holder being shown as mounted in position on a board 3, which may be the seat of a row boat or the like. The construction of the holder and the manner in which it functions may more clearly be seen in Figures 2, 3 and 4 to which reference may now be had.

The holder 2 is made of a strip of spring metal, such as spring steel, of substantially uniform width, which is bent along a smooth curve 4 to form a lower spring jaw 5 and an upper spring jaw 6 which are adapted to be sprung apart to receive a mounting board, such as the board 3, on which the holder is to be mounted. The upper jaw 6 has a reverse bend, as indicated at 8, to form an upwardly extending fishing rod abutment arm 10 the upper portion of which is slightly curved, as indicated at 11, to fit against an appropriate part of the fishing rod. The clip or holder is mounted on the board 3 so that the lower surface of the board is engaged by the upper surface of the lower jaw 5, and the upper surface of the board is engaged by the base of the bend 8.

A sheet metal eye member 15 which is bent substantially into a V shape has its lower end 16 permanently secured to the rod holder as, for instance, by being welded thereto. The eye member 15 includes an upwardly extending arm 18 that has a circular opening or eye 19 therein for receiving an appropriate part of the fishing rod.

Figures 1 and 2 show the manner in which the holder is secured to the fishing rod. The fishing rod includes a handle portion 20 and a separate flexible rod portion 21, the rod portion 21 having an integral cylindrical part 22 thereon which normally fits snugly into a socket in the handle 20 and is removable from the socket by merely pulling the parts 20 and 21 apart. An escutcheon member 23 is usually rigidly secured to the flexible rod portion 21 for limiting the extent of insertion of the part 22 into the handle 20.

In order to mount the holder 2 in place the rod portion 21 is first withdrawn from the handle 20 and the part 22 thereof is then passed through the eye 19 of the holder so that the part 11 of the holder bears against the shank of the part 21 of the fishing rod. Thereafter the part 22 of the rod portion 21 is again reinserted into the holder to the position illustrated in Figure 2, where it is held by friction. At this time the spring metal holder 2 is thus firmly secured to the fishing rod. The holder is of such light weight as to permit the fishing rod to be used in the same manner as though the holder were not in place, that is, for casting or for other fishing wherein the fishing rod 1 is held in the hand. If it is desired to mount the fishing rod on a seat of the boat, as illustrated in Figure 1, that may be done in a simple manner which is obvious, since the lower spring jaw 5 is easily flexible from the full line to the dotted line position of Figure 2. The rod is then held in place and there is sufficient flexibility of the holder so that if the rod is pulled downwardly the abutment arm can flex and so can the projecting portion 18 of the holder. Also, the entire holder has sufficient flexibility so that the abutment arm 10 and the sheet metal eye member 15 can be bent to raise the angle of elevation of the fishing rod, if that is desired, until the fishing rod engages the upper portion of the smooth curve 4 of the holder.

In some types of fishing rods the handle portion 20' (Fig. 6) has an extension 22' integral therewith that telescopes into the rod member. When that is the case the rod-receiving eye member should be placed closer to the smooth curved or arched portion 4 of the holder. This is illustrated in modified construction in Figures 5 and 6. The holder in Figures 5 and 6 differs essentially from that of Figure 4 in that here the sheet metal eye member, indicated at 27, and which corresponds to the eye member 15 of Figure 4, is placed more to the rear of the position of Figure 4 so that the projecting portion 28 which has the eye 29 therein is closer to the curved portion 4. The eye is of such size that the stem 22' of the holder fits snugly through the eye. The portion 30 of the rod to which the rod portion 21 is secured makes a snug friction fit over the portion 22' of the handle. The mode of operation of this holder is the same as that of the previously described embodiment as is apparent.

In some instances it is commercially desirable to make a single fishing rod holder which can be used either with a rod such as shown in Figures 1 and 2, or with a rod such as shown in Figure 6. Such a rod is illustrated in Figure 8. This holder includes two eye members 35 and 36 which correspond, respectively, to the eye members 15 and 27 of Figures 4 and 5, respectively. In this instance the two eye members are hinged to the upper jaw 6 so that each may be swung to an inoperative position overlying the upper jaw 6 when the other eye member is used. In each case the use of the fishing rod holder will be the same as previously discussed in connection with Figures 2 and 6, respectively. In this case the member 35 is hinged to the top of the jaw 6 by a hinge 38, and the member 36 is hinged to the top of the jaw 6 by a hinge 39. Each hinge may be formed in a simple manner as, for instance, by forming a pair of aligned ears 40—40 at the opposite edges of and extending above the jaw 6. These ears may be separate pieces welded to the jaw 6 or may be formed of the same material as the jaw and bent upwardly. The eye members 35 and 36 may be provided with short trunnions that pivot in those ears, and spring pressed to their operative position shown. In each case the fishing rod fulcrums in the eye 19 or 27, as the case may be, and bears against the abutment 11. In each case the construction is such that the holder may be mounted on the fishing rod and will not interfere with the use of the fishing rod in its usual manner.

In compliance with the requirements of the patent statutes I have here shown and described a few preferred embodiments of my invention. It is, however, to be understood that the invention is not limited to the precise constructions here shown, the same being merely illustrative of the principles of the invention. What I consider new and desire to secure by Letters Patent is:

A fishing rod holder comprising a metal member forming a support for a fishing rod and having at its forward end an abutment for a fishing rod and having a rod-receiving eye member secured thereto and spaced from the abutment in a direction lengthwise of the rod and adapted to hold a rod on the abutment, said eye being flexible in a direction towards and from the abutments about an axis spaced below and at right angles to an imaginary line joining the abutment with the eye, and said member being at such an angle to said imaginary line as to wedge with a fishing rod extending therethrough when an attempt is made to draw the rod through the eye lengthwise in the direction towards the tip of the rod while permitting such movement freely in the opposite direction.

PETER W. STEIN.

REFERENCES CITED

The following references are of record in the file of this patent:

UNITED STATES PATENTS

| Number | Name | Date |
|---|---|---|
| 442,685 | Moore | Dec. 16, 1890 |
| 1,296,866 | Skretting | Mar. 11, 1919 |
| 1,608,795 | Kennedy | Nov. 30, 1926 |
| 2,089,452 | Utley | Aug. 10, 1937 |
| 2,265,330 | Waddle | Dec. 9, 1941 |
| 2,444,585 | Tubiolo | July 6, 1948 |